(12) United States Patent
Waugh et al.

(10) Patent No.: US 12,589,525 B2
(45) Date of Patent: Mar. 31, 2026

(54) IN-SITU COMPACTION DURING Z-FIBER REINFORCEMENT OF DRY FIBER PREFORMS

(71) Applicant: Goodrich Corporation, Charlotte, NC (US)

(72) Inventors: Katherine Emily Waugh, Coronado, CA (US); Kyle Rosenbrock, Pueblo, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 135 days.

(21) Appl. No.: 18/413,955

(22) Filed: Jan. 16, 2024

(65) Prior Publication Data

US 2025/0229458 A1 Jul. 17, 2025

(51) Int. Cl.
B29B 11/16 (2006.01)
B29B 11/12 (2006.01)

(52) U.S. Cl.
CPC .............. B29B 11/16 (2013.01); B29B 11/12 (2013.01)

(58) Field of Classification Search
CPC ......... B29C 70/54; B29C 70/24; B29B 11/16; B29B 11/12; D04H 1/46; D04H 18/02
See application file for complete search history.

(56) References Cited

U.S. PATENT DOCUMENTS

| 1,623,075 | A | 4/1927 | Thomas |
| 1,686,439 | A | 10/1928 | Cooke |

| 2,556,406 | A | | 6/1951 | Morris |
| 2,601,432 | A | | 6/1952 | Clements |
| 2,690,149 | A | | 9/1954 | Adams |
| 2,896,303 | A | | 7/1959 | Morrill |
| 3,022,813 | A | | 2/1962 | Glover |
| 3,404,646 | A | | 10/1968 | Ormeaux et al. |
| 3,605,223 | A | | 9/1971 | Hermann |
| 3,611,958 | A | | 10/1971 | Rutledge |
| 3,729,785 | A | | 5/1973 | Sommer |
| 3,845,529 | A | * | 11/1974 | Van Deusen .......... D04H 18/02 28/109 |
| 3,889,326 | A | | 6/1975 | Tyas |
| 3,910,210 | A | | 10/1975 | Marforio |

(Continued)

FOREIGN PATENT DOCUMENTS

| CN | 105755679 | 7/2016 |
| CN | 105986372 | 10/2016 |

(Continued)

OTHER PUBLICATIONS

USPTO; Non-Final Office Action dated Aug. 15, 2024 in U.S. Appl. No. 17/978,104.

(Continued)

*Primary Examiner* — Monica A Huson
(74) *Attorney, Agent, or Firm* — SNELL & WILMER L.L.P.

(57) ABSTRACT

A method for in-situ compaction during z-fiber reinforcement of a dry fiber preform is provided. The method includes positioning a needling assembly adjacent to the dry fiber preform, compacting, via a compaction foot of the needing assembly, the dry fiber preform in a first direction, and needling, via a set of barbed needles, at least a portion of the dry fiber preform beneath a surface of the compaction foot in the first direction.

16 Claims, 5 Drawing Sheets

(56) References Cited

U.S. PATENT DOCUMENTS

| | | | |
|---|---|---|---|
| 3,916,494 | A | 11/1975 | Konig |
| 4,305,339 | A | 12/1981 | Inglis |
| 4,353,158 | A | 10/1982 | Henshaw |
| 4,369,723 | A | 1/1983 | Griffith, Jr. |
| 4,777,706 | A | 10/1988 | Stanislaw |
| 5,016,331 | A | 5/1991 | Dilo |
| 5,125,135 | A | 6/1992 | Kalteis |
| 5,226,217 | A | 7/1993 | Olry et al. |
| 5,511,294 | A | 4/1996 | Fehrer |
| 5,513,423 | A | 5/1996 | Jakob |
| 5,515,798 | A | 5/1996 | Cahuzac |
| 5,564,355 | A | 10/1996 | Watson |
| 5,699,595 | A | 12/1997 | Feyerl |
| 5,800,672 | A | 9/1998 | Boyce et al. |
| 5,894,643 | A | 4/1999 | Fehrer |
| 5,896,633 | A | 4/1999 | Fehrer |
| 6,161,269 | A | 12/2000 | Dilo |
| 6,233,797 | B1 | 5/2001 | Neely |
| 6,360,412 | B1 | 3/2002 | Duval et al. |
| 6,374,469 | B1 | 4/2002 | Baudry et al. |
| 6,405,417 | B1 | 6/2002 | Sheehan et al. |
| 6,591,769 | B1 | 7/2003 | Heidtmann et al. |
| 6,735,837 | B2 | 5/2004 | Pum |
| 7,296,525 | B2 | 11/2007 | Cho |
| 7,497,001 | B2 | 3/2009 | Hall et al. |
| 8,192,662 | B2 | 6/2012 | Asahara et al. |
| 9,193,113 | B2 | 11/2015 | La Forest et al. |
| 10,448,706 | B2 | 10/2019 | Ho |
| 11,491,745 | B2 | 11/2022 | Kim et al. |
| 2003/0097740 | A1 | 5/2003 | Jourde et al. |
| 2003/0136502 | A1 | 7/2003 | Lavasserie et al. |
| 2003/0209179 | A1 | 11/2003 | Scordos |
| 2009/0139808 | A1 | 6/2009 | Bouchard et al. |
| 2009/0301369 | A1 | 12/2009 | Kawaguchi et al. |
| 2013/0255047 | A1 | 10/2013 | Sasur |
| 2013/0255556 | A1 | 10/2013 | Hasegawa |
| 2014/0310928 | A1 | 10/2014 | Kühl |
| 2015/0152582 | A1 | 6/2015 | Takizawa |
| 2018/0103724 | A1 | 4/2018 | Ho |
| 2018/0274144 | A1* | 9/2018 | Evrard ............... D04H 1/46 |
| 2020/0354870 | A1 | 11/2020 | Groelz |
| 2022/0184880 | A1 | 6/2022 | Barnes et al. |
| 2023/0295849 | A1 | 9/2023 | Deng |

FOREIGN PATENT DOCUMENTS

| | | |
|---|---|---|
| CN | 107268197 | 10/2017 |
| CN | 108103671 | 6/2018 |
| CN | 108789447 | 11/2018 |
| CN | 110219097 | 9/2019 |
| CN | 209779164 | 12/2019 |
| CN | 112318499 | 2/2021 |
| CN | 114474958 | 5/2022 |
| CN | 114703605 | 7/2022 |
| CN | 115094575 | 9/2022 |
| DE | 202013105848 | 3/2015 |
| EP | 0484391 | 9/1995 |
| EP | 1384804 | 1/2004 |
| EP | 4144904 | 3/2023 |
| EP | 4461860 | 11/2024 |
| FR | 2794138 | 12/2000 |
| GB | 2310221 | 8/1997 |
| KR | 20100064344 | 6/2010 |
| KR | 101935743 | 1/2019 |

OTHER PUBLICATIONS

USPTO; Non-Final Office Action dated Aug. 29, 2024 in U.S. Appl. No. 18/165,238.

USPTO; Non-Final Office Action dated Sep. 5, 2024 in U.S. Appl. No. 18/165,271.

European Patent Office, European Partial Search Report dated Apr. 16, 2024 in Application No. 23204626.8.

USPTO; Requirement for Restriction dated Mar. 28, 2024 in U.S. Appl. No. 17/978,104.

USPTO; Requirement for Restriction dated Apr. 18, 2024 in U.S. Appl. No. 18/165,238.

USPTO; Requirement for Restriction dated Apr. 18, 2024 in U.S. Appl. No. 18/165,271.

USPTO; Final Office Action dated Feb. 21, 2025 in U.S. Appl. No. 17/978,104.

European Patent Office, European Search Report dated Jul. 8, 2024 in Application No. 23204626.8.

European Patent Office, European Office Action dated Dec. 10, 2024 in Application No. 23204703.5.

USPTO; Notice of Allowance dated Jan. 16, 2025 in U.S. Appl. No. 18/165,238.

USPTO; Notice of Allowance dated Jan. 27, 2025 in U.S. Appl. No. 18/165,271.

European Patent Office, European Search Report dated Feb. 16, 2024 in Application No. 23204703.5.

European Patent Office, European Search Report dated Feb. 16, 2024 in Application No. 23204191.3.

USPTO; Notice of Allowance dated May 9, 2025 in U.S. Appl. No. 17/978,104.

European Patent Office, European Search Report dated Jun. 2, 2025 in Application No. 25150463.5.

USPTO; Notice of Allowance dated Jun. 17, 2025 in U.S. Appl. No. 17/978,104.

* cited by examiner

IN-SITU COMPACTION DURING Z-FIBER REINFORCEMENT OF DRY FIBER PREFORMS

FIELD

The present disclosure relates generally to composite preforms and, more particularly, to in-situ compaction during z-fiber reinforcement of dry fiber preforms.

BACKGROUND

Composite bodies are utilized in various industries, including the aerospace industry. The composite bodies start with a preform that is fabricated using layers of textile material. In the building of a non-woven preform for certain applications including carbon-carbon aircraft brake disks and thermal protection systems, preform material is passed through a loom of non-woven preform fabrication machinery.

SUMMARY

According to various embodiments of the present disclosure, a method for in-situ compaction during z-fiber reinforcement of a dry fiber preform is provided. The method includes positioning a needling assembly adjacent to the dry fiber preform, compacting, via a compaction foot of the needling assembly, the dry fiber preform in a first direction, and needling, via a set of barbed needles, at least a portion of the dry fiber preform beneath a surface of the compaction foot in the first direction.

In various embodiments, the compaction foot is a passively spring-controlled compaction foot. In various embodiments, the compaction foot rides along the surface of the dry fiber preform as the dry fiber preform traverses in at least one second direction. In various embodiments, an amount of pressure applied during the compacting is dependent on a spring force applied by a set of springs coupled to the compaction foot.

In various embodiments, actuation of the compaction foot is actively programmed. In various embodiments, the compaction foot is either picked and placed each time a different portion of the dry fiber preform is needled or rides along the dry fiber preform the dry fiber preform is needled. In various embodiments, an amount of pressure applied during the compacting is controlled via at least one actuator coupled to the compaction foot.

In various embodiments, the compaction foot is configured to increase a resultant fiber density of the dry fiber preform by compacting the dry fiber preform during needling.

Also disclosed herein is a system for in-situ compaction during z-fiber reinforcement of a dry fiber preform. The system includes a compaction foot and a needling head. The compaction foot is configured to compact the dry fiber preform in a first direction. The compaction foot is a passively spring-controlled compaction foot. The needling head includes a set of barbed needles. The needling head is configured to needle at least a portion of the dry fiber preform beneath a surface of the compaction foot in the first direction using the set of barbed needles.

In various embodiments, compaction foot rides along the surface of the dry fiber preform as the dry fiber preform traverses in at least one second direction. In various embodiments, an amount of pressure applied during the compaction is dependent on a spring force applied by a set of springs coupled to the compaction foot.

In various embodiments, the compaction foot includes one hole that all of the set of barbed needles traverse through to needle at least the portion of the dry fiber preform.

In various embodiments, the compaction foot includes a separate hole for each of the set of barbed needles to traverse through to needle at least the portion of the dry fiber preform.

In various embodiments, the compaction foot is coupled directly to the needling head.

In various embodiments, the compaction foot and the needling head are independently supported.

Also disclosed herein is a system for in-situ compaction during z-fiber reinforcement of a dry fiber preform. The system includes a compaction foot and a needling head. The compaction foot is configured to compact the dry fiber preform in a first direction. Actuation of the compaction foot is actively programmed. The needling head includes a set of barbed needles. The needling head is configured to needle at least a portion of the dry fiber preform beneath a surface of the compaction foot in the first direction using the set of barbed needles.

In various embodiments, the compaction foot is either picked up and placed each time a different portion of the dry fiber preform is needled or rides along the dry fiber preform the dry fiber preform is needled.

In various embodiments, an amount of pressure applied during the compaction is controlled via at least one actuator coupled to the compaction foot.

In various embodiments, the compaction foot includes one hole that all of the set of barbed needles traverse through to needle at least the portion of the dry fiber preform.

In various embodiments, the compaction foot and the needling head are independently supported.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

DETAILED DESCRIPTION

Figure 1:
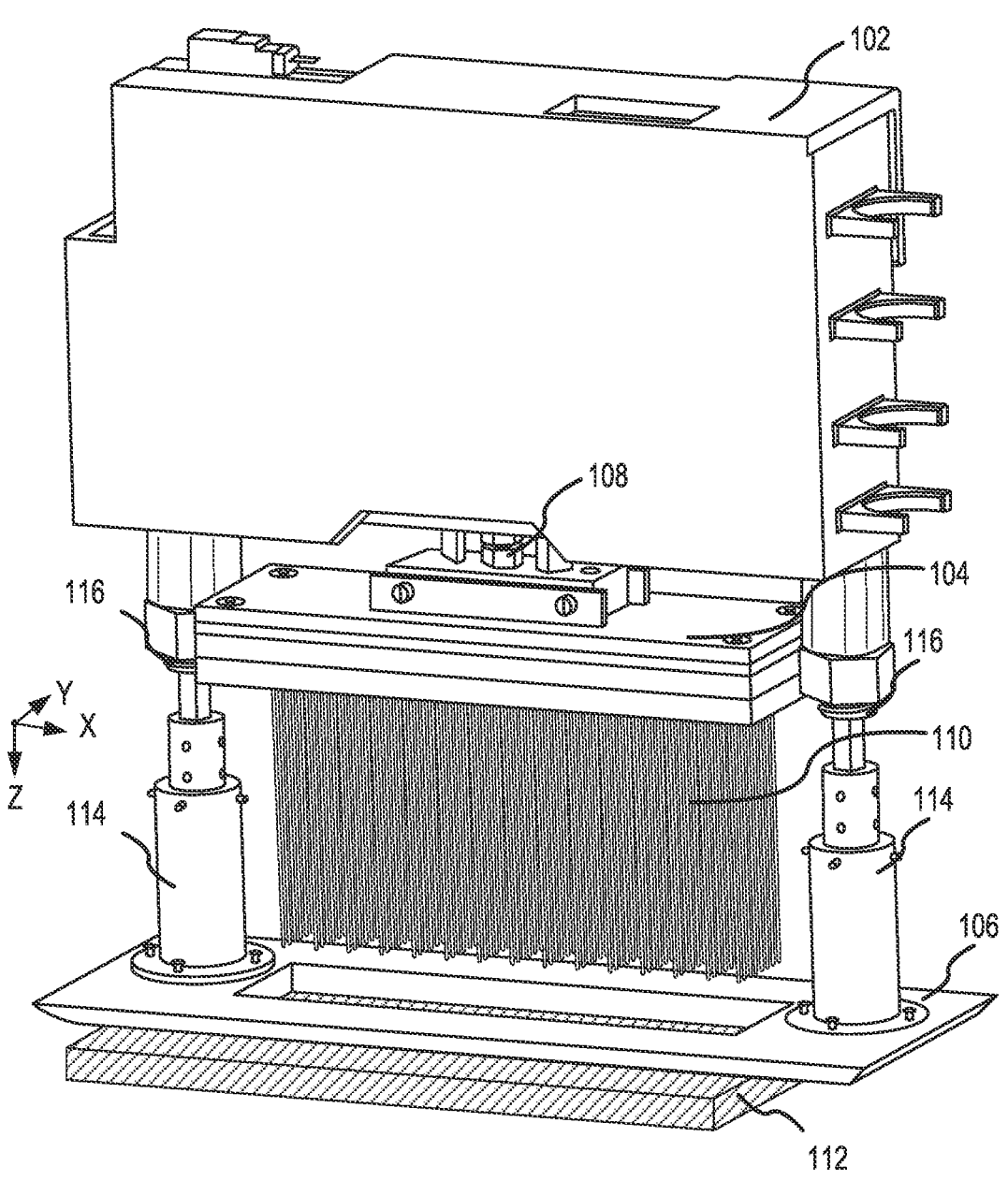
FIG. 1 illustrates a needling head with a spring-controlled compaction foot, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include perma- nent, removable, temporary, partial, full or any other pos- sible attachment option. Additionally, any reference to with- out contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

Z-fiber (or through thickness) reinforcement is a process in which reinforcements (typically fiber) are driven through an in-plane dry fiber/fabric lay-up, stack, or preform, here- inafter referred to simply as a dry fiber preform, to add fibers in a third axis (z-direction). The resultant z-reinforced material is typically referred to as a 2.5D preform. A common method of z-reinforcement is via needling. In needling, barbed needles drag fibers on the surface of a dry fiber preform through the dry fiber preform in a z-direction. During large-scale needling, putting tension on the dry fiber preform is important such that the fibers, when drawn through the dry fiber preform in the z-direction, stretch and break into the dry fiber preform without causing undue wrinkling in the surrounding region.

Disclosed herein are systems and methods for a compac- tion foot that provides both beneficial compaction and localized tension during the needling process. In various embodiments, the compaction foot provides in-situ pressure on the dry fiber preform to increase the resultant fiber density of the dry fiber preform (by further compacting the fabric layers together). Typically, compaction of a dry fiber preform to increase fiber volume occurs either in a post textile processing step called pre-carbonization compression (PCC) or via the application of dead weights during the carbonization/heat-treatment processes. In various embodi- ments, by combining fiber tensioning and compaction into the textile process, post textile processing may be mitigated, and part counts may be increased during carbonization furnace operations by reducing volume taken up by carbon- ization weights. Additionally, by actively controlling com- paction during textile processing, the resultant fiber density may fall into a tighter, more dense distribution than the range typically achieved after PCC or weighted carbonization. That is, in various embodiments, the compaction foot design enables z-reinforcement (e.g. needling) of dry fiber preform with in-situ compaction, thereby increasing resultant fiber density of the dry fiber preform.

In various embodiments, the compaction foot may be passively controlled, i.e., a mechanical reaction, or actively controlled, i.e., a programmed reaction. That is, in various embodiments, the compaction foot may ride along a surface of the dry fiber preform, i.e., a mechanical reaction, or be used in a "pick-up and place" type operation, i.e., a pro- grammed reaction. In various embodiments, in the mechani- cal reaction, the compaction foot may be configured to ride along the surface of the dry fiber preform while the needles are inserted and withdrawn. In various embodiments, the compaction foot may be coupled to a needle head base via a spring plunger or other spring mechanism. Responsive to the needle head mechanism being positioned toward a top surface of the dry fiber preform, the spring plunger positions the compaction foot against the top surface of the dry fiber preform, the compaction foot configured to apply a com- pression force against the dry fiber preform. In various embodiments, the amount of compression force is dependent on the spring force of the spring plunger. In that regard, in various embodiments, the spring plunger may be tuned and/or designed to apply a certain range of compression forces for different applications. That is, in various embodi- ments, dependent on spring force of the springs in the spring plunger, a desired compaction pressure applied by a surface area of the compaction foot may be optimized to provide in-situ compaction, thereby increasing resultant fiber density of the dry fiber preform.

In a different type of mechanical reaction control that may be utilized in textile system with tighter space constraints, in various embodiments, a compression spring and bolt system may be utilized to control a compaction foot. In various embodiments, the compaction foot may be integrated into needling assembly on textile looms. In various embodi- ments, the compaction foot is coupled to top plate via a set of springs and bolts. In various embodiment, the barbed needles are coupled to the top plate and traverse through holes in the compaction foot such that the compaction foot spans approximately a same area spanned by the needles, resulting in additional compaction to the area being needled. In various embodiments, the bolts keep the top plate and the compaction foot aligned such that the needles do not catch on the compression foot and thus, break. In various embodi- ments, the height between the top plate and the compression foot may be adjusted to account for different needle transport depth and height by adjusting a length of the springs. In various embodiments, by adjusting a length of the springs, both tension and compaction may be applied to the dry fiber preform on conveyer belts.

In various embodiments, in the programmed reaction, the compaction foot is actuated with the needles so as to contact the preform surface just prior to the needles being inserted into the preform and removed from the surface of the preform just after the needles are withdrawn from the preform. In various embodiments, an actuator, such as a hydraulic actuator, electrical actuator, or pneumatic actuator, among others, may be commanded to acuate downward, in the z-direction, from any needle head position to contact the surface of the dry fiber preform and force the compaction of the dry fiber preform by the compaction foot. In that regard, in various embodiments, the actuator may actuate the com- paction foot such that a desired compaction pressure is applied by a surface area of the compaction foot and may be optimized to provide in-situ compaction, thereby increasing resultant fiber density of the dry fiber preform.

In various embodiments, either the mechanical reaction- controlled compaction foot or the programmed reaction- controlled compaction foot may be applied to needling equipment of different scales and may be applicable to both flat and non-flat geometries (i.e., production textile looms, lab-scale textile looms, 3-axis gantry robots, or multi-axial robots, among others). Both designs provide a desired compaction pressure applied to a surface area of the com- paction foot that may be optimized to provide in-situ com- paction, thereby increasing resultant fiber density of the dry fiber preform.

Referring now to FIG. 1, in accordance with various embodiments, a needling head with a spring-controlled compaction foot is illustrated. In various embodiments, needling machinery 102 may be coupled to a 3-axis gantry robotic control arm or a multi-axial robot control arm, among others. In various embodiments, the needling machinery 102 may be coupled to a production textile loom or a lab-scale textile looms, among others. In various embodiments, the needling machinery 102 includes a needling head 104 and a compaction foot 106. In various embodiments, the needling machinery 102 includes an actuator 108 that controls the needling head 104. In that regard, in various embodiments, the actuator 108 controls the movement of the needling head 104 in a negative and positive z-direction in order that a set of barbed needles 110 drag fibers that are on the surface of a dry fiber preform 112 through the dry fiber preform 112 in a negative and positive z-direction. In various embodiments, the needling machinery 102 further includes spring plungers 114 that couple the compaction foot 106 to the needling head 104. Responsive to the needling machinery 102 being positioned toward a top surface of the dry fiber preform 112, the spring plungers 114 positions the compaction foot 106 against the top surface, in the positive z-direction, of the dry fiber preform 112. In various embodiments, the compaction foot 106 is configured to apply a compression force against the dry fiber preform 112. In various embodiments, the amount of compression force is dependent on the spring force of the spring plungers 114. In that regard, in various embodiments, the spring plungers 114 may be tuned and/or designed to apply a certain range of compression forces for different applications. That is, in various embodiments, dependent on spring force of the springs 116 in the spring plungers 114, a desired compaction pressure applied by a bottom surface area of the compaction foot 106 may be optimized to provide in-situ compaction, thereby increasing resultant fiber density of the dry fiber preform 112. In various embodiments, the compaction foot 106 may ride along a surface of the dry fiber preform 112 as the needling is performed by the needling head 104 and the barbed needles 110, thereby providing a passive reaction.

Figure 2A:
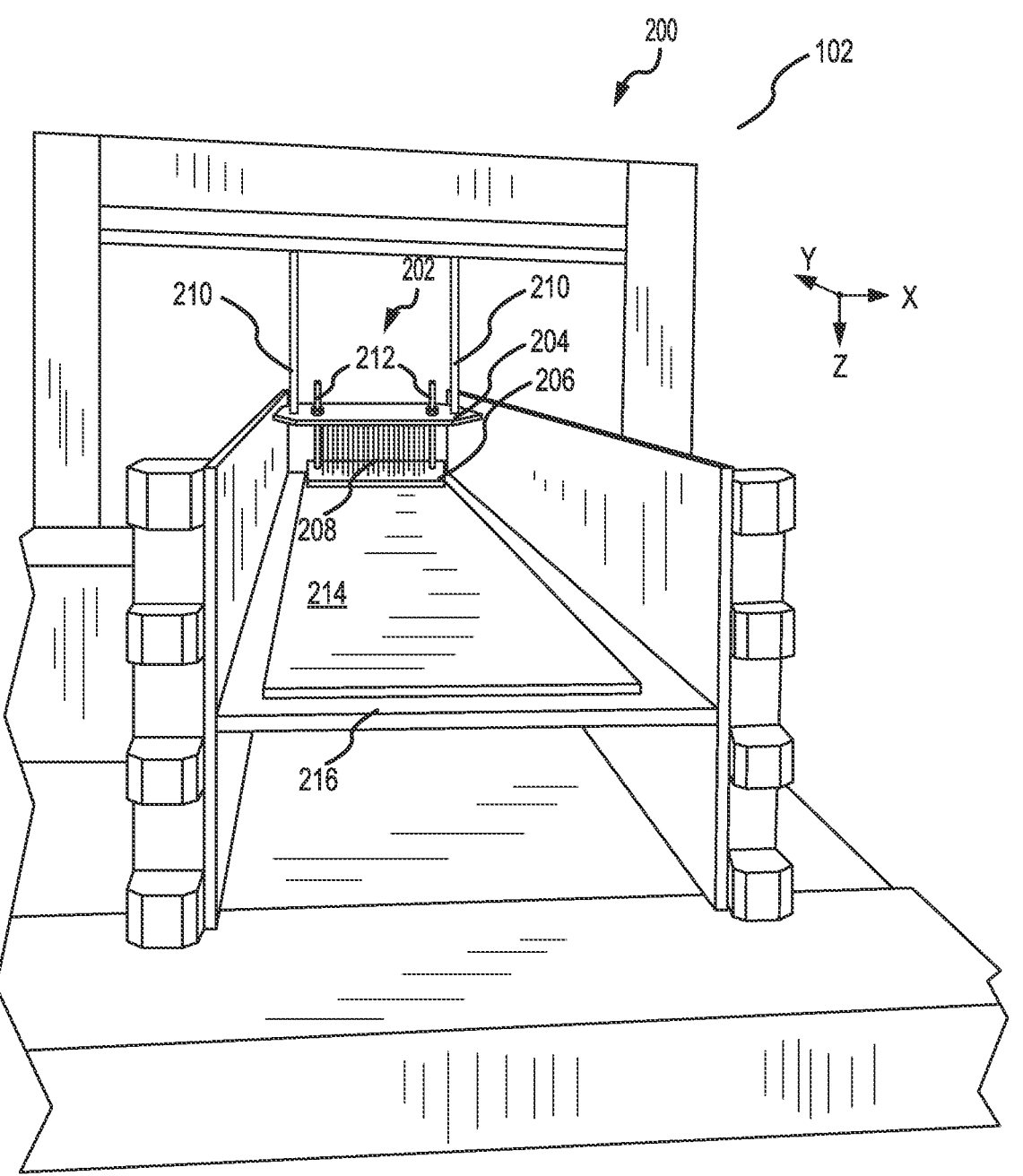
FIGS. 2A, 2B, and 2C illustrate a spring-controlled compaction foot integrated into needling assembly on a textile loom, in accordance with various embodiments.
Figure 2B:
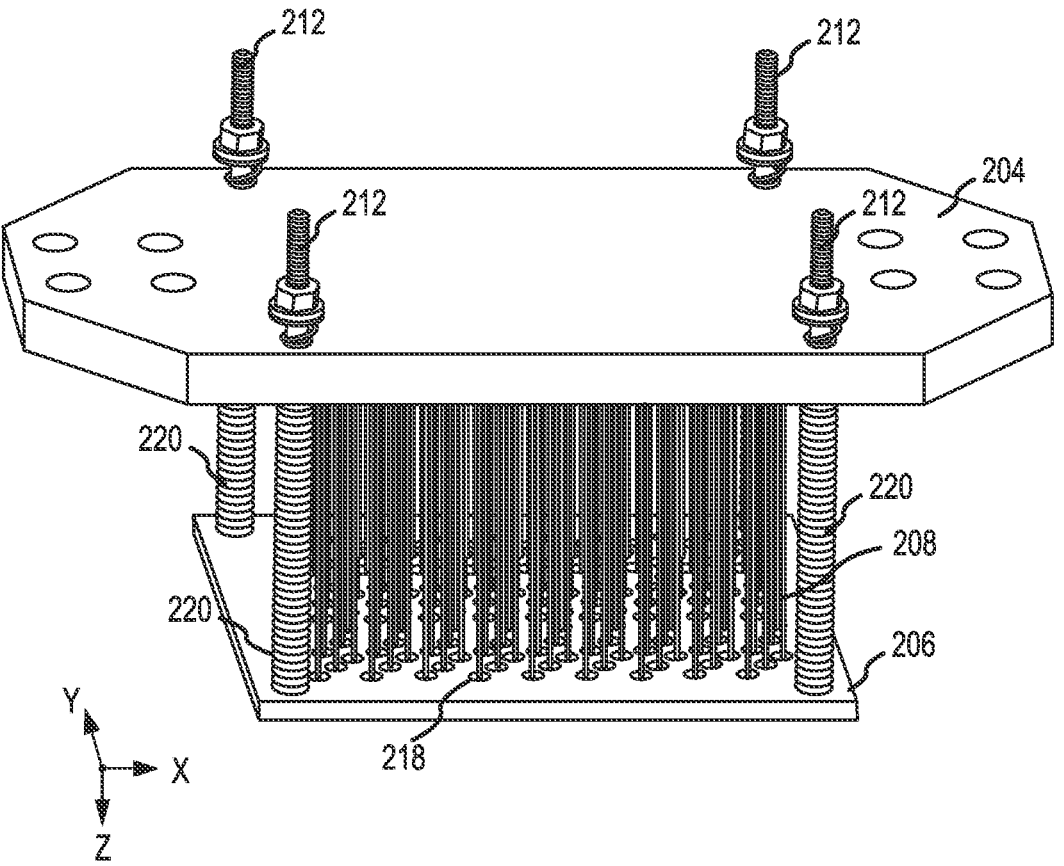
Figure 2C:
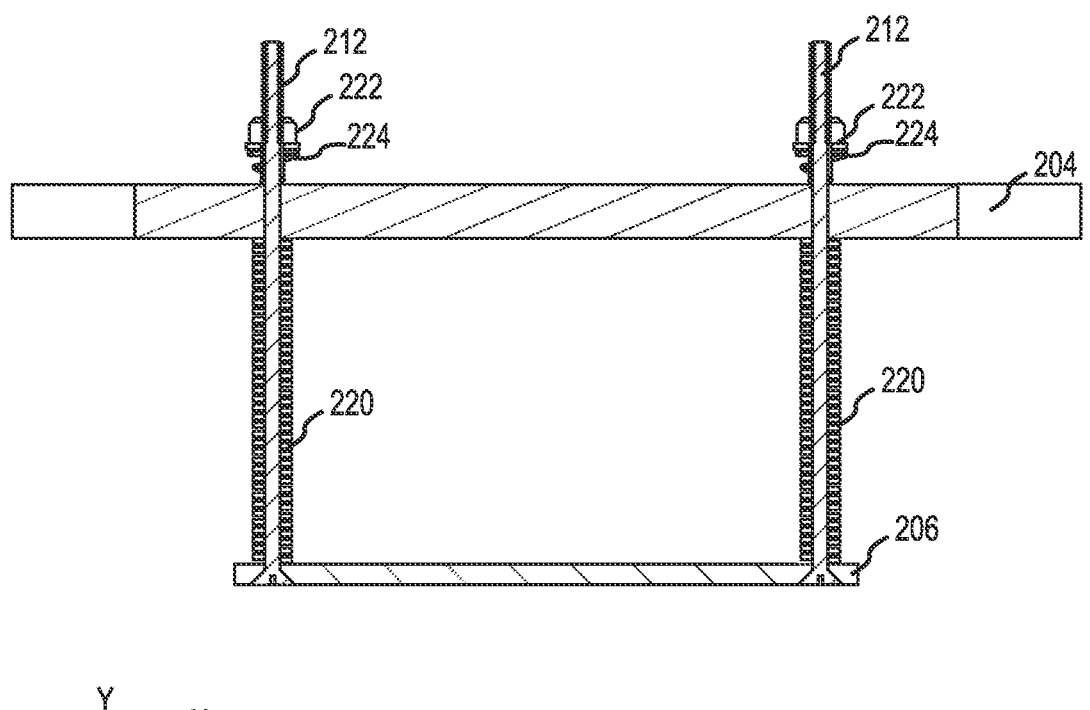

Referring now to FIGS. 2A-2C, in accordance with various embodiments, a spring-controlled compaction foot integrated into needling assembly on a textile loom is illustrated. In various embodiments, textile loom assembly 200 may be a production textile loom or a lab-scale textile looms, among others. In various embodiments, a needling assembly 202 of the textile loom assembly 200 includes a needling head 204 and a compaction foot 206. In various embodiments, needling assembly 202 may be utilized in textile system with tighter space constraints. In various embodiments, a set of barbed needles 208 are coupled to the needling head 204 and each barbed needle in the set of barbed needles 208 traverses through a respective hole in the compaction foot 206 such that the compaction foot 206 spans approximately a same area spanned by the set of barbed needles 208, resulting in additional compaction to the area being needled. In various embodiments, the needling head 204 is coupled to the textile loom assembly via a set of actuators 210 that control the up and down motion in the z-direction of the needling head 204 and thus, the set of barbed needles 208. In various embodiments, the compaction foot 206 is coupled to needling head 204 via a set of partially-threaded bolts 212. In various embodiments, the set of bolts partially-threaded 212 keep the needling head 204 and the compaction foot 206 aligned such that the set of barbed needles 208 do not catch on the compaction foot 206 and thus, break when a dry fiber preform 214 on a conveyer belt 216 is needled. In various embodiments, the compaction foot 206 may ride along a surface of the dry fiber preform 214 as the needling is performed by via a set of actuators 210 coupled to the needling head 204 and the set of barbed needles 208, thereby providing a passive reaction.

With particular attention to FIG. 2B, in various embodiments, a set of barbed needles 208 are coupled to the needling head 204 and each barbed needle in the set of barbed needles 208 traverses through a respective hole 218 in the compaction foot 206 such that the compaction foot 206 spans approximately a same area spanned by the set of barbed needles 208, resulting in additional compaction to the area being needled. In various embodiments, the compaction foot 206 is coupled to needling head 204 via the set of partially-threaded bolts 212. In various embodiments, a set of springs 220, each of which a positioned around a respective bolt of the set of bolts partially-threaded 212, provide for both tensioning and compaction to be applied to the dry fiber perform. In various embodiments, the height between the needling head 204 and the compaction foot 206 may be adjusted to account for different needle transport depth and height by adjusting a length of the set of springs 220.

With particular attention to FIG. 2C, in various embodiments, the set of partially-threaded bolts 212 are fed through the compaction foot 206, a respective one of the set of springs 220, and the needling head 204. In various embodiments, a retainment spring 224 is positioned around the respective bolt prior to a nut 222 being coupled to the respective bolt. In various embodiments, the retainment spring 224 provide tensioning between a bottom surface of the nut 222 and a top surface of the needling head 204. As states previously, in various embodiments, the set of springs 220, each of which a positioned around a respective bolt of the set of partially-threaded bolts 212, provide for both tensioning and compaction to be applied to the dry fiber perform. In various embodiments, the height between the needling head 204 and the compaction foot 206 may be adjusted to account for different needle transport depth and height by adjusting a length of the set of springs 220.

Figure 3:
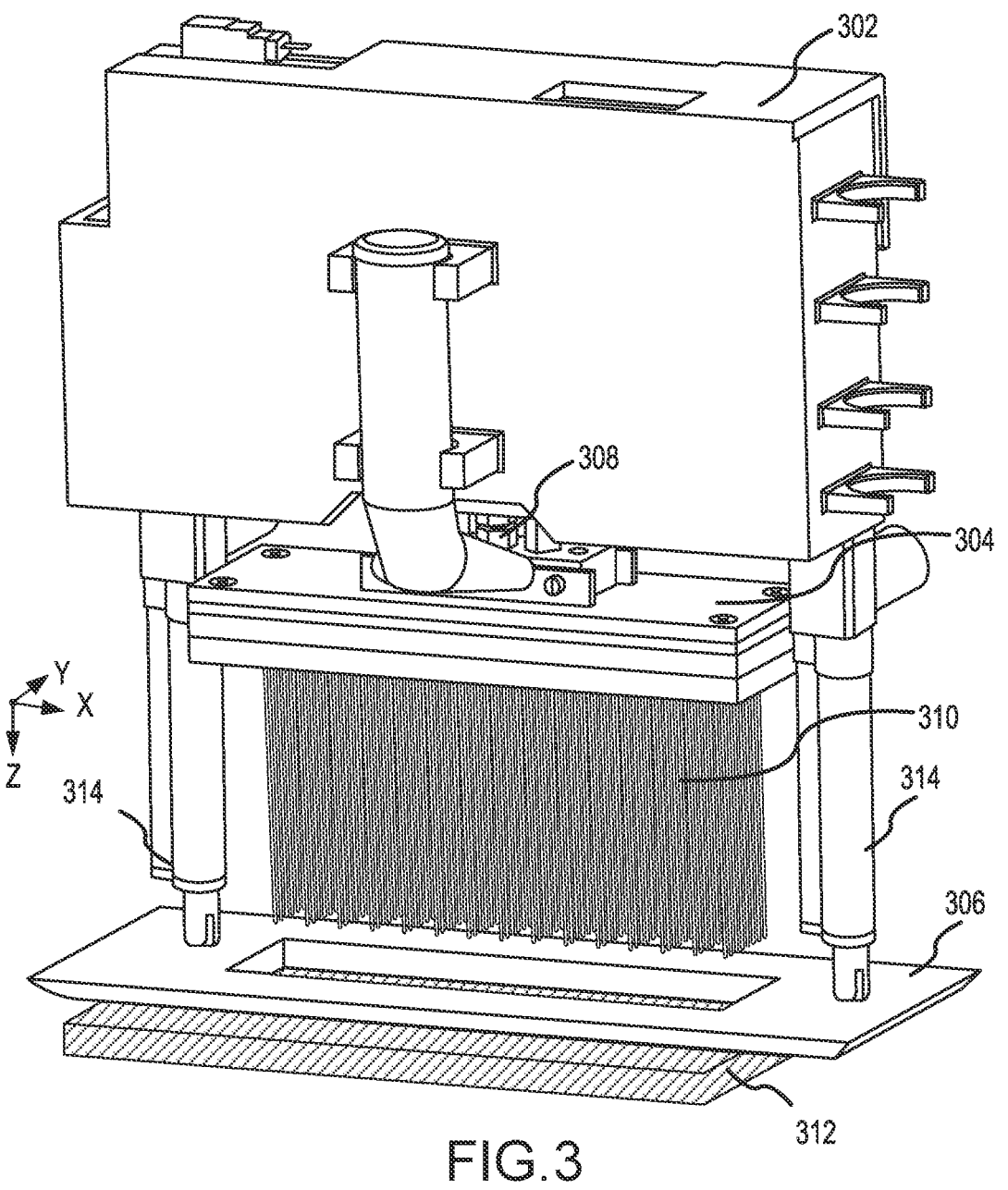
FIG. 3 illustrates a needling head with an actuator-controlled compaction foot, in accordance with various embodiments.

Referring now to FIG. 3, in accordance with various embodiments, a needling head with an actuator-controlled compaction foot is illustrated. In various embodiments, needling machinery 302 may be coupled to a 3-axis gantry robotic control arm or a multi-axial robot control arm, among others. In various embodiments, the needling machinery 302 may be coupled to a production textile loom or a lab-scale textile looms, among others. In various embodiments, the needling machinery 302 includes a needling head 304 and a compaction foot 306. In various embodiments, the needling machinery 302 includes an actuator 308 that controls the needling head 304. In that regard, in various embodiments, the actuator 308 controls the movement of the needling head 304 in a negative and positive z-direction in order that a set of barbed needles 310 drag fibers that are on the surface of a dry fiber preform 312 through the dry fiber preform 312 in a negative and positive z-direction. In various embodiments, the needling machinery 302 further includes actuators 314 that couple the compaction foot 306 to the needling head 304. Responsive to the needling machinery 302 being positioned toward a top surface of the dry fiber preform 312, the actuators 314 are configured to acuate the compaction foot 306 so as to contact the top surface of the dry fiber preform 312 surface just prior to the actuator 308 inserting the set of barbed needles 310 into the dry fiber preform 312. In various embodiments, the actuators are further configured to remove the compaction foot 306 from the top surface of the dry fiber preform 312 surface just after the actuator 308 withdraws the set of barbed needles 310 from the dry fiber preform 312. In various embodiments, the actuators 314 may be a hydraulic actuator, electrical actuator, or pneumatic actuator, among others. In various embodiments, the actuators 314 are configured to be commanded to acuate downward, in the z-direction, from any needle head position to force the compaction foot 306 to contact the top surface of the dry fiber preform 312 and force compaction of the dry fiber preform 312. In that regard, in various embodiments, the actuators 314 may actuate the compaction foot 306 such that a desired compaction pressure is applied by a surface area of the compaction foot 306 and may be optimized to provide in-situ compaction, thereby increasing resultant fiber volume density of the dry fiber preform. Accordingly, the compaction foot 106 may operate in either a ride along a surface of the dry fiber preform operation or a "pick-up and place" type each time a different portion of the dry fiber preform is needled operation, thereby providing an active, programmed reaction.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method for in-situ compaction during z-fiber reinforcement of a dry fiber preform, the method comprising:
   positioning a needling assembly adjacent to the dry fiber preform;
   compacting, via a compaction foot of the needling assembly, the dry fiber preform in a first direction; and
   needling, via a set of barbed needles, at least a portion of the dry fiber preform beneath a surface of the compaction foot in the first direction, wherein the compaction foot is lifted and placed each time a different portion of the dry fiber preform is needled.

2. The method of claim 1, wherein the compaction foot is a passively spring-controlled compaction foot.

3. The method of claim 2, wherein an amount of pressure applied during the compacting is dependent on a spring force applied by a set of springs coupled to the compaction foot.

4. The method of claim 1, wherein actuation of the compaction foot is actively programmed.

5. The method of claim 4, wherein an amount of pressure applied during the compacting is controlled via at least one actuator coupled to the compaction foot.

6. The method of claim 1, wherein the compaction foot is configured to increase a resultant fiber density of the dry fiber preform by compacting the dry fiber preform during needling.

7. A system for in-situ compaction during z-fiber reinforcement of a dry fiber preform, the system comprising:
   a compaction foot, wherein the compaction foot is configured to compact the dry fiber preform in a first direction and wherein the compaction foot is a passively spring-controlled compaction foot; and
   a needling head, wherein the needling head comprises a set of barbed needles and wherein the needling head is configured to needle at least a portion of the dry fiber preform beneath a surface of the compaction foot in the first direction using the set of barbed needles, wherein the compaction foot is lifted and placed each time a different portion of the dry fiber preform is needled.

8. The system of claim 7, wherein an amount of pressure applied during the compaction is dependent on a spring force applied by a set of springs coupled to the compaction foot.

9. The system of claim 7, wherein the compaction foot comprises one hole that all of the set of barbed needles traverse through to needle at least the portion of the dry fiber preform.

10. The system of claim 7, wherein the compaction foot comprises a separate hole for each of the set of barbed needles to traverse through to needle at least the portion of the dry fiber preform.

11. The system of claim 7, wherein the compaction foot is coupled directly to the needling head.

12. The system of claim 7, wherein the compaction foot and the needling head are independently supported.

13. A system for in-situ compaction during z-fiber reinforcement of a dry fiber preform, the system comprising:

a compaction foot, wherein the compaction foot is configured to compact the dry fiber preform in a first direction and wherein actuation of the compaction foot is actively programmed; and a needling head, wherein the needling head comprises a set of barbed needles and wherein the needling head is configured to needle at least a portion of the dry fiber preform beneath a surface of the compaction foot in the first direction using the set of barbed needles, wherein the compaction foot is lifted and placed each time a different portion of the dry fiber preform is needled.

14. The system of claim 13, wherein an amount of pressure applied during the compaction is controlled via at least one actuator coupled to the compaction foot.

15. The system of claim 13, wherein the compaction foot comprises one hole that all of the set of barbed needles traverse through to needle at least the portion of the dry fiber preform.

16. The system of claim 13, wherein the compaction foot and the needling head are independently supported.

* * * * *